Nov. 28, 1967  S. BERTRAM  3,355,590
THREE DIMENSIONAL SURFACE PROFILING SYSTEM USING PHOTOCELL
WHICH REMAINS A FIXED DISTANCE ABOVE THE SURFACE
Filed Oct. 2, 1964  4 Sheets-Sheet 1

INVENTOR
SIDNEY BERTRAM
BY
Abraham Wasserman
ATTORNEY

Nov. 28, 1967 S. BERTRAM 3,355,590
THREE DIMENSIONAL SURFACE PROFILING SYSTEM USING PHOTOCELL
WHICH REMAINS A FIXED DISTANCE ABOVE THE SURFACE
Filed Oct. 8, 1964 4 Sheets-Sheet 2

INVENTOR
SIDNEY BERTRAM
BY
Abraham Wasserman
ATTORNEY

INVENTOR
SIDNEY BERTRAM
BY Abraham Wasserman
ATTORNEY

INVENTOR
SIDNEY BERTRAM
BY
ATTORNEY

United States Patent Office

3,355,590
Patented Nov. 28, 1967

3,355,590
THREE DIMENSIONAL SURFACE PROFILING SYSTEM USING PHOTOCELL WHICH REMAINS A FIXED DISTANCE ABOVE THE SURFACE
Sidney Bertram, Woodland Hills, Calif., assignor to The Bunker-Ramo Corporation, Canoga Park, Calif., a corporation of Delaware
Filed Oct. 8, 1964, Ser. No. 402,511
14 Claims. (Cl. 250—202)

ABSTRACT OF THE DISCLOSURE

A system for generating signals indicative of the three-dimensions of a surface is provided by moving a sensing device in a scanning pattern over the three-dimensional surface. The mechanism which drives the sensing device in a scanning pattern also provides output signals indicative of each incremental location of the sensing device within a two-dimensional plane wherein the scanning motion is described. Meanwhile, the sensing device emits a light beam which is reflected from a point on the surface of the object being profiled. The reflected light beam is analyzed and provides error signals whereby the sensing device may be positioned at a predetermined height above the device being profiled, at which time a signal representative of the distance of the sensing device from a predetermined plane is provided, indicative of the third axial dimension of the device being profiled.

---

This invention relates to a surface profiling system and, more particularly, to a system for automatically deriving surface data of a three-dimensional model.

In recent years, numerically controlled systems for automating the operation of various machines have been developed. Such systems generally include electronic computers in which basic data related to the operations of the machines is stored. For example, when a three dimensional structural part is to be automatically machined, data related to the desired configuration or surface dimension of such a part must first be supplied to the computer.

Basic data to be stored is usually obtained from a model used to develop the shape or configuration of the structural part. For example, such data may comprise the three coordinates of each of a plurality of points sufficient to define the surface of the part.

Similar surface data of a three dimensional model is also useful in recently developed automatic styling systems in which some design functions hereinbefore performed only by skilled stylists are now partially automated. Basically, in such systems surface data obtained from a design model or drawings is first stored in a computer. Thereafter, the data is modified in accordance with computer programs so that drawings of modified designs are automatically produced without the need to actually build modified models.

Obtaining surface data for a sufficient number of points so as to properly define the surface of the three dimensional model by actually measuring the coordinates of each point is quite laborious as well as most expensive. To reduce the amount of effort and cost, devices have, therefore, been developed to automatically produce the desired data related to the points on the three-dimensional surface. For example, devices have been developed to automatically scan the surface of a three-dimensional model or object and produce coordinate data related to a plurality of points on such surface. However, such known devices are expensive and due to their complexity, require highly skilled operators, which further increases the cost of their use. According to the teachings of the present invention, however, a novel system for automatically producing data related to three coordinates of each of a plurality of points on the surface of the three-dimensional model is provided; the system performs with a high degree of accuracy, and is relatively inexpensive and simple in its mode of operation.

The present invention is based on a technique whereby a surface of a three-dimensional model is profiled in a predetermined pattern so that three coordinate data for each of a plurality of points on the surface is automatically derived. Two coordinate data for each of the points is obtained as a function of the position of a surface sensor over a two dimensional profiling pattern, the plurality of positions of the encoder within the pattern being related to a plurality of points on the surface. The third coordinate of each point, which is a function of the distance between such point and a reference plane, is derived by recording the distance between the sensor and the reference plane, with the position of the sensor being constantly controlled to be at a fixed distance from the particular point on the surface.

In brief, the present invention comprises a surface sensor which is positionable in a two coordinate profiling pattern, comprising an equidistantly displaced plurality of parallel profiling lines. At each position of the sensor along the profiling pattern, it is directly aligned with one point on the surface of the three-dimensional model, so that the two coordinates of the sensor with respect to its profiling pattern are directly related to two coordinates, respectively, of the point. Thus, according to the teachings of the present invention, signals related to the coordinates of the sensor's position within the profiling pattern are produced and recorded, thereby recording two coordinates of the particular point of interest. The third coordinate of the particular point of interest is derived by recording the distance between the sensor and a reference plane with the sensor being automatically controlled to be at a fixed distance above the particular point. The automatic positioning of the sensor is accomplished by generating signals therein, which are reflected by the particular point under observation on the surface of the model. The reflected signals are analyzed to provide error signals indicative of an error in the distance between the sensor and the point on the surface. The error signals are used to energize circuitry for controlling the position of the sensor so that the distance between it and the point is adjusted to be equal to the fixed predetermined distance. The change in the position of the sensor required to properly position it with respect to the point is related to the third coordinate of such point, and therefore is used to provide a signal indicative of such third coordinate.

The three-dimensional data for each point measured is provided in the form of signals which may directly be supplied to the computer to be stored therein. The signals may also be conveniently recorded on machine-readable media such as a punched card or magnetic tape, so that at some later date the data may be used by the computer in conjunction with electronic circuitry to automatically machine structural parts or produce designs or styles based on the recorded surface characteristics of the three-dimensional model.

The novel features which are believed to be characteristic of the invention, together with other advantages thereof, will be better understood from the following description, taken in conjunction with the accompanying drawings, in which.

Figure 1:
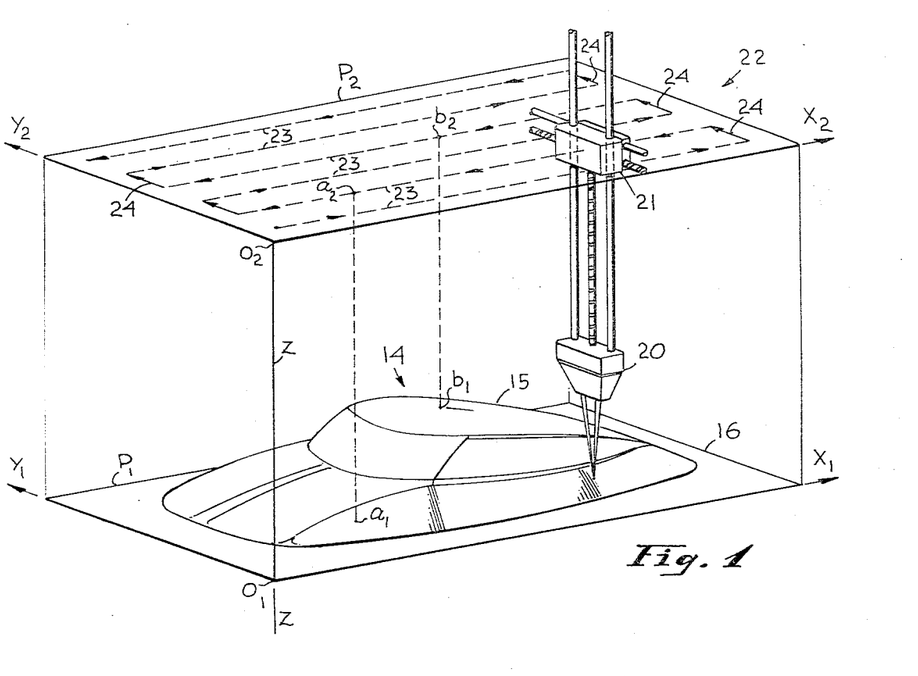
FIGURE 1 is an isometric view of a simplified arrangement useful in explaining the teachings of the present invention.

Reference is now made to FIGURE 1, which shows a simplified arrangement useful in explaining the principles of the present invention. As seen therein, a three-dimensional object, such as an automobile model 14 having an outer surface 15, is supported on plane structure 16. The plane structure 16 is in a plane $p_1$ defined by mutually perpendicular axes $X_1$ and $Y_1$, intersecting at a point of origin $o_1$. Thus, two coordinates of each point on the surface 15 are definable with respect to the point of origin $o_1$. In addition, a surface sensor 20 is shown mounted within an encoder housing 21 which is mounted above the surface 15 in a profiling structure 22. The profiling structure 22 is in a plane $p_2$ which is defined by mutually perpendicular axes $X_2$ and $Y_2$, intersecting at a point of origin $o_2$. Origin points $o_1$ and $o_2$ are aligned with a line Z which is perpendicular to both planes $p_1$ and $p_2$. Thus, the coordinates of the sensor 20 with respect to the point $o_2$ are directly related to the coordinates of a point on the surface 15 directly below it with respect to the point of origin $o_1$.

The sensor housing 21 is moved in the plane $p_2$ along a profiling pattern generally designated by a plurality of dashed lines 23 and 24. The lines 23, which are hereinafter also referred to as the profile lines, are parallel to the $X_2$ axis.

In operation, the sensor 20 is moved along each of the profile lines 23. When reaching the end of any of the lines, the sensor is stepped over in the $Y_2$ direction by a preselected distance designated by the arrowed lines 24. Thereafter, the sensor moves again along a second profiling line 23, until the entire profiling pattern is traversed. At each of a plurality of positions along the profiling pattern, two coordinates of the sensor's position with respect to the point of origin $o_2$ are recorded. Since at each such position, the sensor 20 is aligned with respect to a related point on the surface 15, the recorded coordinates of the sensor's position, therefore, also represent the coordinates of the respective point with respect to the point of origin $o_1$. For example, when the sensor 20 is at a position $a_2$ along the profiling pattern, the two coordinates thereof with respect to the point of origin $o_2$ also represent the coordinates of a point $a_1$ with respect to the origin point $o_1$, point $a_1$ on the surface 15 being directly aligned with the sensor 20 at the position $a_2$. Similarly, the coordinates with respect to the origin $o_1$ of point $b_1$ on the surface 15 are represented by signals produced as a function of the position of the sensor 20 at the point $b_2$ along the profiling pattern, points $b_1$ and $b_2$ being directly aligned with one another.

Signals related to the position of the sensor along its profiling pattern may be produced for any desired number of positions of the sensor along each of the profiling lines. Also, the extent of the stepover of the encoder in the $Y_2$ direction may be changed so that the sensor traverses along a greater or smaller number of profiling lines. Thus, the total number of points whose coordinates with respect to the origin $o_2$ are to be recorded may be controlled.

Figure 2:
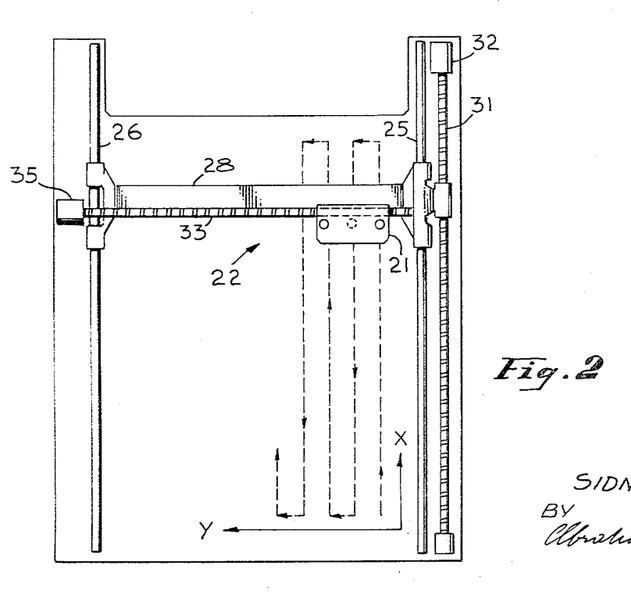
FIGURE 2 is a top elevational view of a profiling structure incorporated in the present invention.

Reference is now made to FIGURE 2, which is a top view of the profiling structure 22. As seen therein, the profiling structure 22 comprises a pair of guide rails 25 and 26 for guiding the motion of a housing support structure 28 in the $X_2$ axis direction, the actual position therealong being controlled by an X axis drive screw 31 driven by an X axis control circuit 32. The sensor housing 21 is shown connected to the housing support structure 28. In addition, a Y axis drive screw 33 supported by the housing support structure 28, controls the position of the housing 21 in the Y axis direction, in response to rotational motion supplied by a y axis control circuit 35. The X axis circuit 32 controls the rotation of the X axis drive screw 31 thereby controlling the position of the structure 28 as well as the housing 21 coupled thereto in the $X_2$ direction. When the housing 21 reaches the end of any of the profiling lines 23, the Y axis circuit 35 is energized to turn the Y axis drive screw 33 so that the housing 21 is stepped over in the $Y_2$ direction by the desired distance.

It is thus seen that by controlling the circuits 32 and 35, the exact profiling pattern is controlled. Namely, the length of each profiling line as well as the spacing between profiling lines may be changed. In addition, the circuit 32 may be controlled so that the housing 21 is positioned at a selected number of positions along each profiling line, thus controlling the total number of positions of the housing 21 as well as the sensor 20 along the profiling pattern. At each position, signals related thereto are recorded, thereby providing two coordinate data of the sensor and the point on the surface 15 related thereto. The signals may be produced by any one of known techniques. For example, encoders (not shown) may be attached to the housing 21 and the structure 28 to translate their positions into electrical signals.

In addition to deriving the two coordinate data for each of a plurality of points on the surface 15, the present invention also derives data related to the third coordinate of each point. In the arrangement shown in FIGURE 1, such third coordinate may be thought of as the height coordinate, namely, the relative height of each of the points of interest on the surface 15 with respect to a reference plane, such as the plane $p_1$ through the point of origin $o_1$. As previously stated, such third height coordinate is derived as a function of the height changes necessary to maintain the sensor 20 at a fixed distance or height above each of the points.

Figures 3, 4:
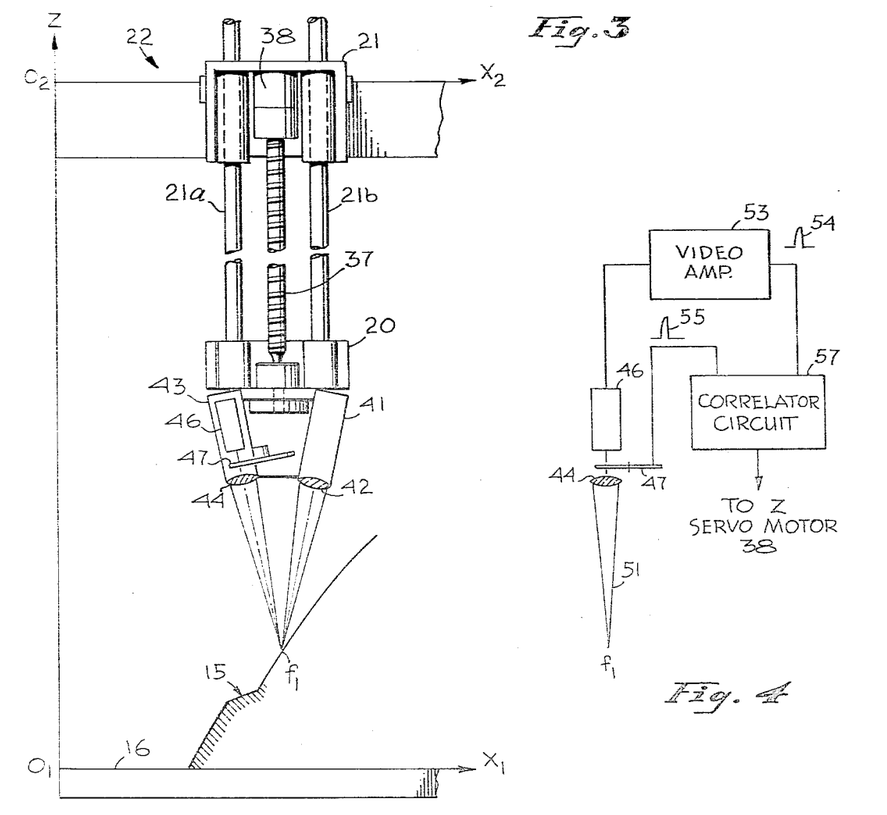
FIGURE 3 is a simplified elevational view of one embodiment of a surface sensor of the invention.
FIGURE 4 is a partial block diagram of circuitry used in conjunction with the surface sensor shown in FIGURE 3.

For a more complete understanding of the invention, reference is now made to FIGURE 3 which is an elevational view of one embodiment of the surface sensor of the present invention. As seen therein, the sensor 20 is slidably mounted on rods 21a and 21b of the housing 21. The sensor 20 is also coupled to a Z axis drive screw 37 which is driven by a Z axis control circuit 38. The sensor 20 is slidable on the rods 21a and 21b as a result of the rotation of the Z axis drive screw 37 by the Z axis circuit 38, thereby controlling the height of the sensor 20 with respect to the surface 15. The sensor 20 generates a signal which is reflected by an incremental point on the surface 15. The reflected signal is then analyzed to obtain controlling error signals which are used to control the sensor 20 to be at a fixed height above the surface 15. Whenever the distance between the sensor and the point of reflection differs from such fixed height, height error signals are generated which are used to automatically adjust the height of the sensor 20 to be at the fixed height above the surface. The changes in the height position of the sensor 20 required to maintain the sensor at the fixed height above the surface 15, therefore, represent changes in height of points on the surface. Thus, such changes in height are used to provide height data of the points on the surface. Namely, they are used to provide the third coordinate or height coordinate for each one of the points of interest on the surface.

Referring again to FIGURE 3, the sensor 20 is shown comprising a source of light such as a projector 41. The projector 41 by means of a lens 42 provides a fine spot of light at a fixed position therefrom. The sensor 20 also includes a light collecting member 43 having an imaging lens 44. A photomultiplier 46 and a scanning member 47 having a moving aperture in the image plane are mounted within the member 43. Light from the projector 41 is diffusely reflected by the surface 15 to the member 43, wherein it is modulated by the scanning member 47 prior to impinging on the photomultiplier 46. The scanning member, in addition to modulating the light reflected thereto, provides a reference signal at a selected point during each scanning cycle. The signals produced by the photomultiplier 46 in response to the modulated light impinging thereon are analyzed with respect to the reference signal produced by the scanning member to provide error signals which are indicative of any error in the position of the sensor 20 with respect to the point of reflection on the surface 15.

If there is a diffusely reflecting surface point at the point of intersection of the optical axes of the projector 41 and the member 43, namely, if the sensor 20 is at the desired fixed height above a particular point on the surface 15, such as the point $f_1$, a centrally located image would be formed in the member 43, and the scanning member would modulate the light impinging on the photomultiplier 46 accordingly. The signal, produced in response to such modulated light, when analyzed with the reference signal provided by the scanning member 47, will produce zero error signals, thus, indicating that the sensor 20 is at the proper height above the point $f_1$. But, if the sensor 20 is not at the proper height above the surface point $f_1$, the reflecting surface will not be at the point of intersection of the two optical axes. Rather, the point $f_1$ may be above or below the point of intersection of the optical axes, thus, resulting in the reflected image being correspondingly offset in the member 43. The scanning member 47 would then modulate the light to the photomultiplier 46 so that together with the reference signal, error signals proportional to the error in the position of the sensor 20 with respect to the surface point $f_1$ are produced. The error signals are used to energize the Z axis circuit 38 so that the height position of the sensor is changed by means of the Z axis drive screw 37. The sensor is raised or lowered until its position is adjusted to be at the fixed height above the reflecting surface point $f_1$.

The sensor 20 should remain above a point such as the point $f_1$, the coordinates of which are to be recorded, for a period long enough to enable the system to automatically adjust the height of the sensor to be at the fixed height above the point $f_1$, or within allowable error tolerances. Thereafter, the height of the sensor is recorded to provide the height coordinate of the point $f_1$. For example, the height of the sensor 20 when being at the proper distance above a point $g_1$ may be regarded as zero height. Thereafter, the height of the sensor properly spaced above any point directly represents the height coordinate of the point. Once such height coordinate is recorded, the sensor 20 mounted within the housing 21 is moved to a second position along the profiling pattern hereinbefore described. At the second position, the system again automatically adjusts the sensor 20 to be at the fixed height above the second point, the coordinates of which are to be recorded.

According to the teachings of the present invention, any one of a number of scanning techniques may be employed to modulate the reflected light impinging on the photomultiplier 46 or modulate the resulting output signal thereof in accordance with the position of the light reflected thereon. In one embodiment of the present invention, a conventional Nipkow disc is used as the scanning member 47. The disc is rotatable so that the plurality of apertures therein move in the image plane to modulate the light reflected by the surface 15 which impinges on the photomultiplier 46.

It is to be understood that various features are shown in exaggerated positions and dimensions for clarity of description. For example, the projector 41 and light collecting member 43 shown in FIGURE 3 are actually quite small and the angle between their optical axes is likewise small. By making that angle small, the sensor can follow steeper surfaces than if the angle is large, as shown. It is also pointed out that means (not shown) may be provided to permit rotating the sensor 90° about the Z axis to enable the system to follow steep surfaces that would otherwise interfere with either the transmitted or reflected beams of light.

Reference is now made to FIGURE 4 which is a simplified block diagram of circuitry used in conjunction with the embodiment of the surface sensor of the invention shown in FIGURE 3. As seen in FIGURE 4, a cone of light 51 passing through the imaging lens 44 is directed through the scanning member 47 towards the photomultiplier 46. The photomultiplier 46 produces a signal which is related to the modulated light impinging thereon. The characteristics of the signal which is amplified in a video amplifier 53 are directly dependent on the modulated light impinging on the photomultiplier 46. For explanatory purposes it may be assumed that a signal 54 from the video amplifier 53 has a well defined peak similar to the peak of a reference signal 55 produced by the scanning member 47. The time, or phase relationship, between the signals 54 and 55 is chosen so that the two signals are coincident in time whenever the reflecting surface, such as at the point $f_1$ shown in FIGURE 3, is at the point of intersection of the optical axes of the projector 41 and the light collecting member 43. Namely, the two signals are in time coincidence whenever the sensor 20 is at the required fixed height above the surface 15. However, if the sensor 20 is above or below its desired height position, the signals 54 and 55 will occur at different times.

The time difference between the occurrence of the two signals is directly related to the error in the height position of the sensor 20 with respect to the surface 15. Thus, according to the teachings of the present invention, such time difference is detected by correlating or comparing the two signals 54 and 55. The magnitude of the time difference is used to produce error signals which are used to control and adjust the height position of the sensor 20 with respect to the surface 15, so as to reduce the error signals to zero. The correlation or comparing operation is performed in a correlator circuit 57, the output of which is supplied to the Z axis circuit 38 so that the height position of the sensor 20 may be changed.

Figure 5:
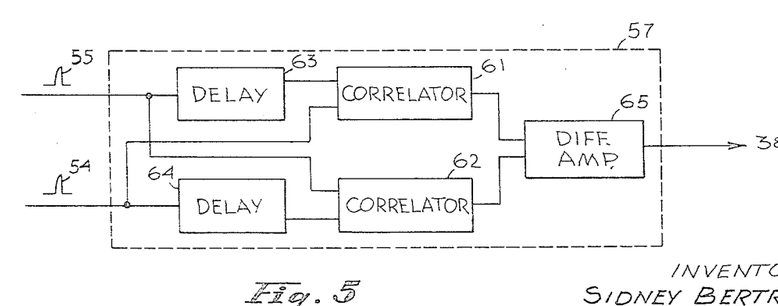
FIGURE 5 is a simplified block diagram of some of the circuitry shown in FIGURE 4.

Reference is now made to FIGURE 5 which is a block diagram of the correlator circuit 57 shown in FIGURE 4. As seen from FIGURE 5, the circuit 57 comprises a pair of correlators 61 and 62 and a pair of delay stages 63 and 64. Signals 54 and 55 are directly supplied to inputs of the correlators 61 and 62, respectively. Similarly, the signals 54 and 55 are also supplied to correlators 62 and 61 respective delay lines 64 and 63, respectively. The outputs of the correlators 61 and 62 are supplied to a difference amplifier the output of which is connected to the Z axis drive circuit 38. If the signals 54 and 55 are coincident in time, then the outputs of the correlators 61 and 62 are equal so that the output signal of the difference amplifier is substantially zero. However, if a time difference exists between the signals 54 and 55, one of the correlators 61 and 62 will produce an output signal greater than the other correlator circuit so that the output of the difference amplifier will be other than zero.

For example, if the signal 54 is generated earlier in time than the signal 55, by delaying the signal 54 in the delay stage 64, the two signals supplied to the correlator 66 are brought into better correlation therein. The opposite is true with respect to correlator 61, since by delaying, in delay stage 63, the signal 55 which to begin with is delayed in time with respect to the signal 54, the correlation in the correlator 61 is worsened. Thus, the output of correlator 62 will be considerably greater than the output of correlator 61. The difference between the two output signals will therefore result in an output signal or error signal from the difference amplifier. The error signal is used to adjust the height position of the sensor 20 so as to retard the occurrence of the signal 54 in time, and thereby bring it into time coincidence with the reference signal produced by the scanning member 47. When the signal 54 is delayed in time with respect to the reference signal 55, the output of correlator 61 is greater than the output of correlator 62 so that the difference amplifier produces an error signal of opposite polarity, which is similarly supplied to the Z axis circuit 38 to control the position of the sensor 20 in a direction opposite to that in which it is controlled in the previous example.

From the foregoing description, it is seen that at each point on the surface 15, the coordinates of which are to be recorded, the sensor 20 generates a pair of signals. The two signals are analyzed on the basis of time relationships therebetween. Whenever the two signals are not in time coincidence, which occurs whenever the sensor 20 is not at the proper height above the surface 15, the circuitry associated with the sensor generates error signals. These signals are used to adjust the position of the sensor to be at the fixed height above the surface 15 and thereby reduce the error signals to zero. The sensor 20 should remain above a point, the coordinates of which are to be recorded, for long enough a period for the system to automatically adjust the height of the sensor until the signal produced in response to the modulated light impinging on the photomultiplier 46 is brought into time coincidence with the reference signal produced by the scanning member 47.

The faster the Z axis circuit 38 changes the height position of the encoder 20, the faster do the two signals come into time coincidence, so that desired data may be obtained at a faster rate. However, since the system used to change the position of the sensor 20 is mechanical in nature, requiring an actual change in the position of the scanner, it has an inherent sluggish response. An appreciable time must, therefore, elapse before the system properly positions the sensor 20 in accordance with the error signals supplied thereto from the correlator circuitry 47. Such sluggish response, in turn, affects the speed with which the sensor 20 in the housing 21 may be moved along the profiling pattern hereinbefore described. Thus, the inertia of the mechanical system used to control the height position of the sensor 20 limits the speed with which three coordinate data may be obtained for a plurality of points on the surface 15.

Figure 6:
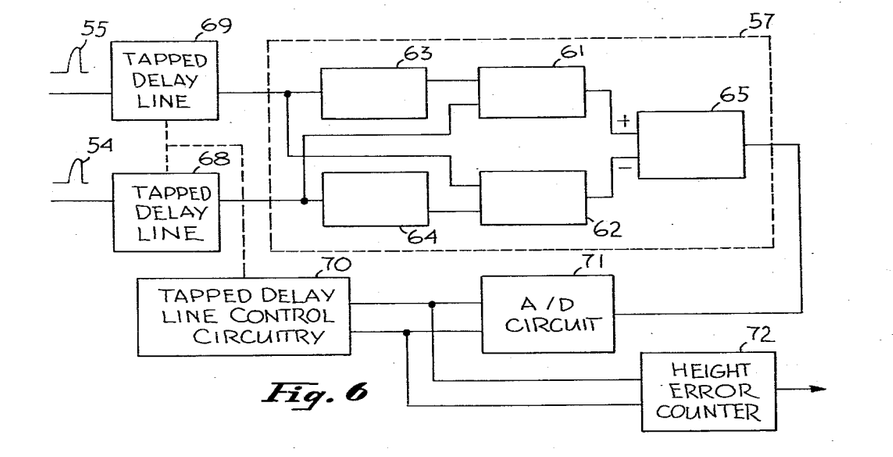
FIGURE 6 is a block diagram of additional circuitry which may be used with the surface sensor shown in FIGURE 3.

Reference is now made to FIGURE 6 which is a block diagram of additional circuitry which may be employed in conjunction with the embodiment of the sensor shown in FIGURE 6. It comprises an inertialess electronic servo system the use of which greatly minimizes the time necessary for the sensor to be stationary above each of the points, the height data of which is to be detected and recorded. Whereas in the previously described arrangements, signals 54 and 55 are directly supplied to delay stages 64 and 63, respectively, of the correlator circuit 57, in the present embodiment of the invention, signals 54 and 55 are supplied to the delay stages 64 and 63 through respective tapped delay line stages 68 and 69. The tapped delay line stages 68 and 69 are controlled by tapped delay line control circuitry 70 which is energized by positive and negative digital signals or pulses produced by an analog-to-digital (A/D) converter circuitry 71. Whenever the signals 54 and 55 are not in time coincidence, an error signal is produced by the difference amplifier 65 as hereinbefore described.

Such an error signal is supplied as the input to the A/D circuitry 71. Therein, the signal from the difference amplifier 65 is converted into related positive or negative digital signals which are in turn used to energize the tapped delay line control circuitry 70.

The tapped delay lines 68 and 69 are controlled by introducing differential delays with respect to the signals 54 and 55 so that any time difference in the occurrence thereof is minimized. For example, let us assume that signal 54 occurs earlier in time than signal 55. Then, according to the foregoing description, the output from the correlator 62 will be considerably greater than the output from the correlator 61, resulting in a negative error signal from the difference amplifier 65 which, when converted by the A/D circuit 71, will result in the production of a negative digital output signal supplied to the tapped delay line control circuitry 70. Consequently, tapped delay lines 68 and 69 will be energized by the circuitry 70 so that an apparent delay is introduced with respect to the signals 54 and 55, the introduced delay tending to reduce any time difference between the two signals. The difference amplifier 65 will continue to produce negative error signals which will in turn result in the production of additional negative digital signals supplied to the control circuitry 70. Additional differential delays will be introduced between the signals 54 and 55 until sufficient delay will cause the two signals to appear as if they have occurred in time coincidence. Thereafter, the output of the difference amplifier 65 will be zero, so that no additional differential delays will be necessary.

From the foregoing, it is thus seen, that instead of bringing the signal 54 into time coincidence with the reference signal 55 by varying the height position of the sensor 20 as hereinbefore described, the signals 54 and 55 may be brought into apparent time coincidence by the differential delay units 68 and 69. The number of digital signals supplied by the A/D circuit 71 is directly related to the error in the height position of the sensor 20. Therefore, such digital signals may be supplied to a height error counter 72, so that by recording the count therein, the error in the height position of the sensor with respect to the surface 15 may be determined. Knowing the height position of the sensor 20 above each given point on the surface 15 as well as knowing the desired height thereof above such points, the height data, or height coordinate of each of such points may be easily calculated.

Figures 7, 8:
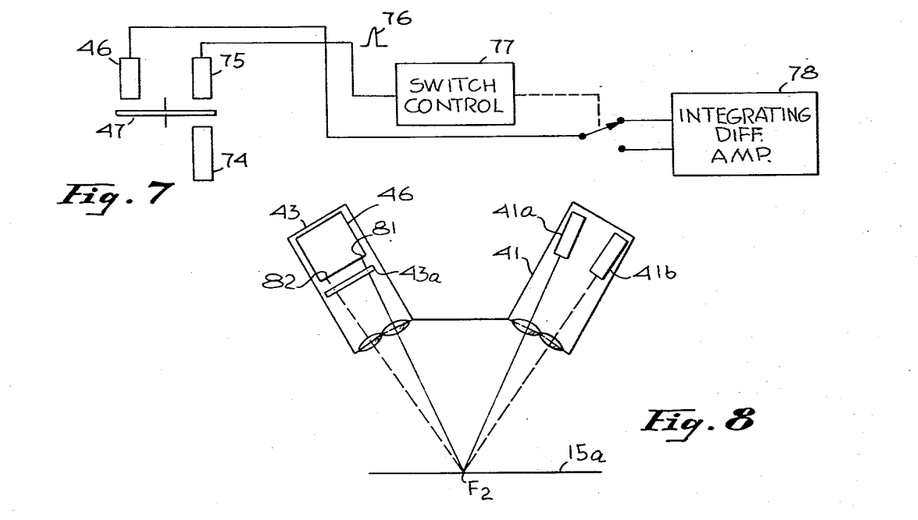
FIGURE 7 is a simplified block diagram of circuitry used in conjunction with another embodiment of the surface sensor of the present invention.
FIGURE 8 is a further embodiment of a surface sensor of the present invention.

In the foregoing description of the embodiments of the present invention it has been assumed that the scanning member 47 provides a reference signal such as the output signal 55. This signal is analyzed with the signal which is related to the modulated light impinging on the photomultiplier to determine time coincidence therebetween. Various techniques may be employed to generate such a reference signal at predetermined instants during the scanning operation. For example, electro-optical techniques may be employed to provide a reference output signal from a photocell which is so disposed with respect to a light source that the reference signal may be produced. Such an electro-optical arrangement is shown in FIGURE 7 to which reference is now made. As shown, a reference light source 74 is located adjacent a photocell 75, a portion of the scanning member 47 being disposed inbetween. Light from the reference light source 74 impinges on the cell 75 only when reference apertures on the rotating scanning member 47 are properly positioned between the two elements, thus producing an output signal 76 from the photocell 75. In addition to the electro-optical technique for generating the reference signal 76 shown in FIGURE 7, other techniques may be used. For example, the scanning member 47 may be provided with a magnetic track so that reference signals may be produced to be correlated with signals related to light which is modulated during each scanning cycle.

Referring again to FIGURE 7, there is shown another embodiment of a sensor in accordance with the present invention. Whereas in the previously described embodiments of the invention, the reference signal as well as the signal from the photomultiplier in response to light impinging thereon were compared or correlated to produce the error signals, in the present embodiment the reference signal 76 is supplied to a switch control circuit 77. The output signal of the photomultiplier 46 is switchable by the switch control circuit 77 between two input terminals of an integrating difference amplifier 78. The output signals of the photomultiplier 46 are alternately supplied to the two input terminals of the difference amplifier, so that during the first half of each scanning cycle of the scanning member 47, the output of the photomultiplier is supplied to one input terminal, and during the next half cycle the output of the photomultiplier is supplied to the other input terminal of the integrating difference amplifier 78. The switching is accomplished by means of the switch control circuit 77.

Whenever the sensor 20 is properly positioned with respect to the surface 15, equal amounts of modulated light impinge on the photomultiplier 46 during both half scanning cycles. Consequently the signals supplied to the amplier 78 during each half cycle, which are integrated therein, are equal, thereby resulting in a zero error signal from the amplifier. However, if due to error in the position of the sensor 20, more light impinges on the photomultiplier 46 during one half of a scanning cycle than during the other half cycle, the integrated signals during the two half cycles are not equal, thus resulting in an error signal being produced by the integrating difference amplifier 76. Such error signal is in turn used to energize the Z axis circuit 38 in a manner similar to that hereinbefore described. Thus, in the present embodiment of the invention, instead of correlating the reference signal with respect to the output signal of the photomultiplier 46, the reference signal is used to energize the switch control circuit 77 so that the output signals of the photomultiplier 46 are switchable between two input terminals of the amplifier 78 during the midpoint of each scanning cycle.

Reference is now made to FIGURE 8 which is an elevational view of another embodiment of a sensor of the present invention. In the arrangement shown in FIGURE 8, the projector 41 comprises a pair of light sources 41a and 41b which are equidistantly displaced with respect to the central axis of the projector 41. When the sensor shown in FIGURE 8 is at the proper height above a point $F_2$ on a surface 15a, the light from the light sources 41a and 41b is reflected at the point $F_2$ and collected by the light collecting member 43. Therein, the light passing through a mask 43a impinges on the photomultiplier 46 about points 81 and 82. The points 81 and 82 are equidistantly displaced with respect to the center of the field of view of the light collecting member 43, with the opening in the mask 43a being selected so that the total light impinging about points 81 and 82 is substantially equal when the sensor is properly positioned. The sensor shown in FIGURE 8 is operable by alternately energizing light sources 41a and 41b. The light impinging on the photomultiplier 46 while the light source 41a is energized is integrated and compared with the light impinging on the photomultiplier when light source 41b is energized. The comparison of the two integrated signals results in the production of an error signal indicative of any error in the position of the encoder with respect to the point $F_2$ on the surface 15a.

Figure 9:
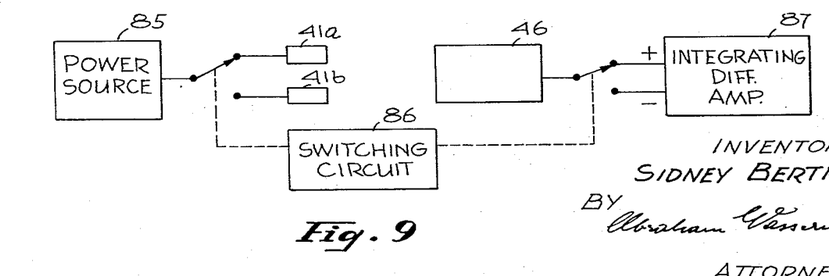
FIGURE 9 is a simplified block diagram useful in explaining the operation of the embodiment of the surface sensor shown in FIGURE 8.

For a better understanding of the operation of the encoder shown in FIGURE 8, reference is made to FIGURE 9 which is a simplified block diagram of the circuitry associated with such a sensor. As seen from FIGURE 9, the circuitry includes a power source 85 which is switchable by a switching circuit 86 between the light sources 41a and 41b. Let us assume that during the first half of each switching cycle, energy is supplied to the light source 41a by the power source 85, with power being supplied to the light source 41b during the second half of each switching cycle. Then, during the first half of each cycle light from source 41a impinges on the photomultiplier 46. During this period, namely, during the first half of the switching cycle, the photomultplier 46 is connected to one input terminal of an integrating difference amplifier 87 so that the light from source 41a impinging thereon is integrated in the amplifier. During the second half of the switching cycle, power from the power source 85 is supplied to the light source 41b and the photomultiplier 46 is connected to the other terminal of the integrating difference amplifier 87, so that the light from source 41b impinging thereon is supplied to the amplifier to be integrated therein. Any difference in the amount of light impinging on the photomultiplier 46 during the two half cycles results in an error signal being produced by the difference amplifier 87.

As long as the sensor of FIGURE 8 is at the proper height above the point $F_2$, equal amounts of light will impinge on the photomultiplier 46 during each half cycle of the switching cycle so that the output of the difference amplifier 87 will be substantially zero. However, if the point $F_2$ is not at the point of intersection of the optical axes of the projector 41 and the light collecting member 43, namely, if the sensor of FIGURE 8 is not at the proper height above the point $F_2$, more light from one of the two light sources will impinge on the photomultiplier 46. Thus, the total amounts of light impinging on the photomultiplier 46 during the two half cycles of the switching operation will not be equal. Consequently the integrating difference amplifier 87 will produce an output error signal which may be used to energize the Z axis control circuit 38 hereinbefore described.

For example, as seen from FIGURE 8, if the distance between the sensor shown in FIGURE 8 and the surface 15a is less than the desired distance therebetween, more light will pass through the opening of the mask 43a and therefore impinge on the photomultiplier 46 when light source 41a is energized, since the light from source 41a will impinge closer to the optical axis. Consequently, the integrated signals during the first half cycle will be grater than the integrated signals during the second half of each cycle, resulting in a net signal from the integrating difference amplifier 87. On the other hand, if the distance between the sensor shown in FIGURE 8 and the surface 15a is greater than the desired distance therebetween, more light will impinge on the photomultiplier 46 when light source 41a is energized since the light will be impinging closer to the optical axis resulting in an output from the integrating difference amplifier 87 having a polarity opposite to that of the previous example.

Figure 10:
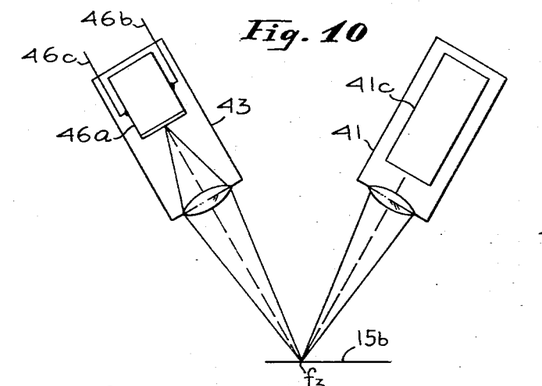
FIGURE 10 is still another embodiment of a surface sensor of the present invention.
Figure 11:
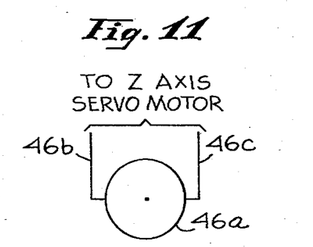
FIGURE 11 is a front view of a basic component used in the embodiment of the surface sensor shown in FIGURE 10.

Reference is now made to FIGURE 10 which is an elevational view of still another embodiment of a surface sensor of the present invention. As seen therefrom, the projector 41 comprises a single light source 41c and the light collecting member 43 comprises a single cell 46a having a pair of leads 46b and 46c. A unique characteristic of the photocell 46a, a front elevation of which is shown in FIGURE 11, is the production of a potential difference across the leads 46b and 46c which is related to the point on the surface of the photocell at which light impinges. Namely, if light impinges on the face of the photocell 46b at the center thereof, the potential difference between the leads 46b and 46c is zero. However, as light impinges to the left or to the right of the center of the face of the cell 46a, potential differences of opposite polarities will result between the leads 46b and 46c. Thus, such potential differences may provide an indication of the point at which light impinges on the surface of the cell 46a with respect to the center thereof. Such a photocell is manufactured and sold by Texas Instruments Incorporated, Houston, Tex., as Model LS–221.

In the sensor shown in FIGURE 10, as long as the sensor is at the proper height above a reflecting point $F_3$ on a surface 15b, the light from the light source 41c will be collected within the member 43 to impinge at the center of the face of the cell 46a. However, as soon as the distance between the sensor and the point $F_3$ varies from the fixed desired distance, the light from the light source 41c will impinge on the surface of the cell 46a at points on one side or the other of the center thereof, depending on the sense of the error in the position of the sensor with respect to the point $F_3$. For example, from FIGURE 10, it is seen that if the distance between the sensor and point $F_3$ is shorter than the desired distance, light from light source 41c will impinge on the face of the cell 46a below the center thereof. Conversely, if the distance between the sensor and the point $F_3$ is greater than the desired distance, light will impinge on the face of the photocell 46a above the center thereof. Thus, the potential difference between the leads 46b and 46c of the photocell 46a, as well as the polarity of the potential difference, are directly related to the error in the position of the sensor with respect to the point $F_3$ on the surface 15b. In a similar arrangement to that shown in FIGURE 10, a pair of photocells with a common lead may be used to produce an effect similar to that of the single cell hereinbefore described.

In conjunction with the circuitry thus far described, it may well be desirable to provide means for alerting an operator in the event the system becomes "lost" for one reason or another and cannot function properly. Such means, which are not shown, may take the form of circuitry that provides an output only if the system is energized and yet no output is obtained from the sensor. This would indicate to an operator that the sensor is much too close to or too far away from the surface under inspection and that manual readjustment is necessary.

From the foregoing description of the present invention, it is seen that surface data of a three-dimensionl model may be automatically obtained by recording three coordinates for each of a plurality of points on the surface of interest. Two coordinates of each point are recorded as a function of the position within a profiling pattern of a surface sensor which is aligned with such point. The number of points is conveniently controllable by varying the number of positions in the profiling pattern at which coordinate data is recorded. The third coordinate of each point, which hereinbefore was also referred to as the height coordinate, is recorded by monitoring the change in the height position of the sensor necessary to maintain the sensor at a fixed height above the particular point.

Basically, in each of the different embodiments of the sensor of the present invention, signals such as light emitted by the sensor is reflected back thereto by the point on the surface, the height coordinate of which is to be recorded. The reflected light is then converted into related signals which are analyzed to provide error signals. The error signals are a function of the distance between the sensor and the point on the surface. If such distance is equal to a fixed distance, zero error signals are produced. However, if the distance between the sensor and the point of interest differs from such fixed distance, error signals related to such position difference are produced.

In most of the embodiments of the present invention, the error signals are automatically used by the system to adjust the position of the sensor to be at the desired distance from the point of interest.

In some of the embodiments of the present invention, scanning techniques are employed to modulate the light reflected to the sensor. Signals related to the modulated light are then correlated with respect to reference signals to provide the desired error signals. In other embodiments of the invention, the amount of light reflected to the sensor during specific portions of switching cycles are used to provide the error signals. In still another embodiment of the invention, the directional orientation of the reflected light within the sensor is used to provide such error signals which are then automatically used to correct the position of the sensor, thereby adjusting its position to be at the desired distance from the surface at each point, the height coordinate of which is to be recorded.

Accordingly, there has thus been described and shown herein a novel and useful system for detecting the surface of a three-dimensional model and recording position data related thereto. Modifications in the specific arrangements as shown may be made by one familiar in the art without departing from the true spirit of the invention. Therefore, all such modifications and equivalents are deemed to be within the scope of the invention as claimed in the appended claims.

In the foregoing description, circuits 32, 35 and 38 have been described as control circuits for controlling the position of the sensor 20 along the three axes, X, Y and Z, respectively. Each of the circuits may include a servo motor responsive to input signals to control the sensor along one of the axes. In addition, each of the circuits may include an encoder coupled to the drive motor in order to provide signals indicative of the rotational position of the motor which is related to the position of the sensor along the respective axis. Thus, signals representing the position of the sensor along each of the three axes are provided. The signals may be automatically recorded to provide a three coordinate record of positions of the sensor 20 along the three axes, thereby providing a record of three coordinate data of points on the surface 14.

Figure 12:
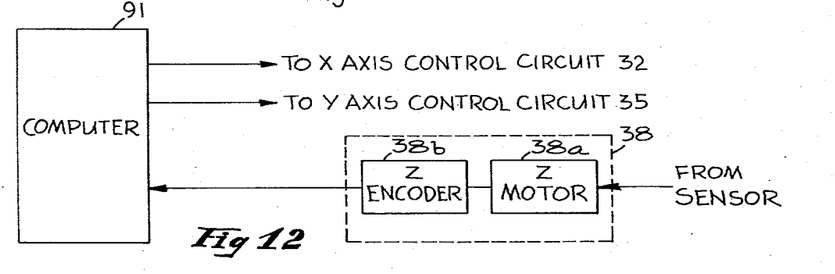
FIGURE 12 is a simplified block diagram of a recording arrangement for recording data according to the teaching of the invention.
Figure 13:
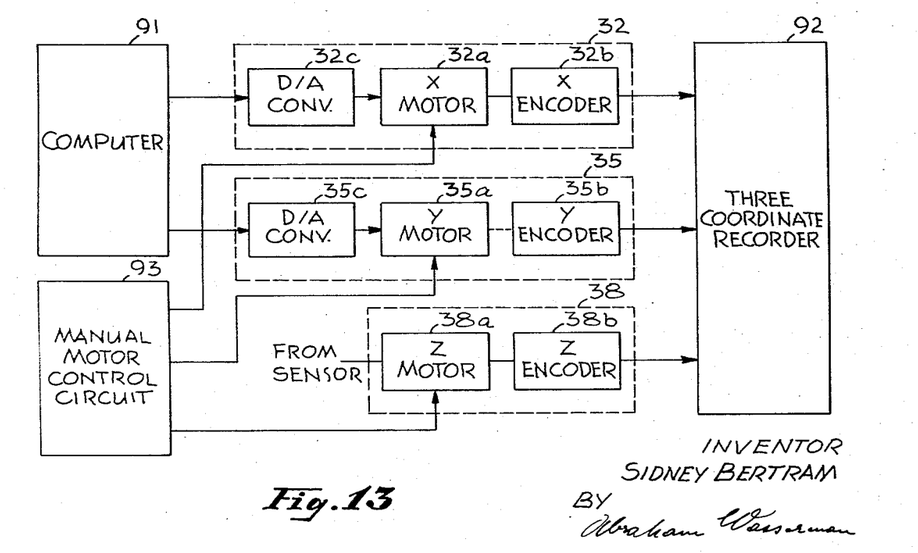
FIGURE 13 is a simplified block diagram of another recording arrangement.

Reference is now made to FIGURES 12 and 13 which are simplified block diagrams of arrangements for recording the three coordinate data hereinbefore referred to. In FIGURE 12, a conventional computer 91 is shown connected to the X axis and Y axis control circuits 32 and 35, respectively. The computer is programmed in a well known manner to automatically supply these circuits with signals so that the sensor may be moved along the profiling pattern as hereinbefore described. The computer also retains this two coordinate data for each position of the sensor in the profiling pattern. At each position, error signals may be supplied to the Z axis control circuit 38 which, in turn, controls the height of the sensor 20 above the particular point on the surface 15 under inspection. As seen in FIGURE 12, the circuit 38 comprises a Z drive motor 38a responsive to such error signals. The rotational position of the motor 38a is supplied to a Z encoder 38b which provides signals indicative of the rotational position of the motor 38a. These signals are provided to the computer which records and retains them. Thus, three coordinate data for each point on the surface 15 is retained in the computer.

In FIGURE 13, the circuits 32 and 35 are shown comprising an X drive motor 32a connected to an X encoder 32b and a Y drive motor 35a connected to a Y encoder 35b, respectively. Motors 32a and 35b are energized by signals from the computer 91 provided through digital-to-analog (D/A) converters 32c and 35c, respectively, so as to control the positions of the sensor in the X and Y directions, respectively. The position in the Z direction is controlled by the Z drive motor 38a. The encoders 32b, 35b and 38b are connected to a three coordinate recorder 92 to supply thereto signals related to the rotational positions of their respective motors at any given point. However, such positions are related to the position of the sensor, which is in turn related to the coordinates of a point on the surface 15. Thus, the signals provided to the recorder 92 represent the three coordinate data of such a point.

In order to provide for initial adjustment of the system, a manual motor control circuit 93 is utilized and is connected to energize the X, Y and Z drive motors 32a, 35a and 38a, respectively. The circuit 93 may provide energizing power under the manual control of an operator to cause a drive motor (or motors) to rotate in either direction to adjust the sensor to a desired position from which automatic operation of the system is initiated. The manual control circuit 93 may also be utilized to re-locate the sensor should the system become "lost" due to being unable to follow a very steep surface or a surface discontinuity.

Although in the foregoing description it has been assumed that the three coordinate data of each point on the surface is recorded, it is apparent that the signals from the encoders may directly be used to control a numerically controlled machine so that a part having a configuration like the scanned surface 15 may be automatically manufactured. For example, a milling machine may be operated to automatically mill a part to have surface characteristics related to the scanned model.

I claim:

1. An automatic profiling system for deriving three-coordinate data for a point on a surface of a three-dimensional object comprising:
   sensing means;
   means for automatically positioning said sensing means at a position along a profiling pattern so as to be substantially aligned with said point on said surface;
   means for determining two coordinate data for said point as a function of said position of said sensing means along said profiling pattern;
   means for automatically controlling the distance between said sensing means and said point on said surface to be substantially equal to a predetermined distance; and
   means for determining third coordinate data for said point as a function of the position of said sensing means when positioned at a distance from said point substantially equal to said predetermined distance.

2. An automatic system for deriving three-coordinate data for each of a plurality of points on a surface of a three-dimensional object comprising:
   sensing means;
   means for automatically successively positioning said sensing means at each of a plurality of positions along a profiling pattern, at each of said plurality of positions said sensing means being substantially aligned with a different point of a plurality of points on said surface;
   means for determining two-coordinate data for each of said points on said surface as a function of the position of said sensing means along said profiling pattern when said sensing means is aligned with each of said points;
   means for controlling at each position along said profiling pattern the distance between said sensing means and the respective point at the position to be substantially equal to a predetermined distance; and
   means for determining third coordinate data for each of said plurality of points on said surface as a function of the position of said sensing means when positioned at a distance from each of said points substantially equal to said predetermined distance.

3. The system as recited in claim 1 wherein said sensing means comprises:
   a light source;
   light projecting means for projecting light from said source towards said point;
   means for collecting light reflected at said point; and
   means for analyzing the light collected to provide error signals indicative of a difference between said predetermined distance and the actual distance between said sensing means and said point.

4. An automatic system for deriving three-coordinate data for a point on a surface of a three-dimensional object comprising:
   sensing means including signal generating means and signal responsive means;
   means for automatically positioning said sensing means at a position along a profiling pattern so as to be substantially aligned with said point on said surface, said signal responsive means being responsive to at least a portion of the signals generated by said signal generating means and reflected thereto by said surface at said point;
   means for recording two-coordinate data for said point as a function of said position of said sensing means along said profiling pattern;
   means for analyzing the signals reflected to said signal responsive means for providing error signals indicative of a difference between a predetermined distance between said sensing means and said point and the actual distance between said sensing means and said point;
   means responsive to said error signals for automatically controlling the position of said sensing means so that the distance between said sensing means and said point is substantially equal to said predetermined distance; and
   means for recording third coordinate data for said point as a function of the position of said sensing means when substantially at said predetermined distance from said point.

5. An automatic system for deriving three-coordinate data for a point on a surface of a three-dimensional object comprising:
   sensing means including light projecting means and light collecting means;
   means for automatically positioning said sensing means at a position along a profiling pattern so as to be substantially aligned with said point on said surface, said light collecting means collecting at least a portion of the light projected by said light projecting means and reflected thereto by said surface at said point;
   means for recording two coordinate data for said point as a function of the position of said sensing means along said profiling pattern;
   means for analyzing the collected light for providing error signals indicative of a difference between a predetermined distance between said sensing means and said point and the actual distance between said sensing means and said point;
   means responsive to said error signals for automatically controlling the position of said sensing means so that the distance between said sensing means and said point is substantially equal to said predetermined distance; and
   means for recording third coordinate data for said point as a function of the position of said sensing means when substantially at said predetermined distance from said point.

6. An automatic system for deriving three-coordinate data for a point on a surface of a three-dimensional object comprising:
   sensing means including light projecting means, light collecting means and scanning means;
   means for automatically positioning said sensing means at a position along a profiling pattern so as to be substantially aligned with said point on said surface, said light collecting means collecting at least a portion of the light projected by said light projecting means and reflected thereto by said surface at said point, said collected light being modulated by said scanning means scanning in a plurality of scanning cycles;
   means for recording two-coordinate data for said point as a function of the position of said sensing means along said profiling pattern;
   reference signal generating means for generating a reference signal;
   means for converting the modulated light into a source signal;
   means for comparing said reference signal and said source signal to detect time delay variations therebetween;

means for providing an error signal as a function of the time delay between said reference signal and said source signal;

means responsive to said error signals for automatically controlling the position of said sensing means to be substantially at a predetermined distance from said point; and means for recording third coordinate data of said point as a function of the position of said sensing means when substantially at said predetermined distance from said point.

7. An automatic system for deriving three-coordinate data for a point on a surface of a three-dimensional object comprising:

sensing means including light projecting means, light collecting means and scanning means;

means for automatically positioning said sensing means at a position along a profiling pattern so as to be substantially aligned with said point on said surface, said light collecting means collecting at least a portion of the light projected by said light projecting means and reflected thereto by said surface at said point, said collected light being modulated by said scanning means scanning in a plurality of scanning cycles;

means for recording two-coordinate data for said point as a function of the position of said sensing means along said profiling pattern;

reference signal generating means for generating a reference signal at the middle of each scanning cycle;

integrating difference amplifier means having two input terminals;

means including switching means responsive to said reference signal for supplying signals related to the light collected during each half scanning cycle to a different one of the two input terminals of said integrating difference amplifier means, said supplied signals being integrated therein to provide an output error signal which is a function of the difference in the amount of light collected during the two halves of each scanning cycle;

means responsive to said error signal for automatically controlling the position of said sensing means to be substantially at a predetermined distance from said point; and means for recording third coordinate data for said point as a function of the position of said sensing means when substantially at said predetermined distance from said point.

8. An automatic system for deriving three-coordinate data for a point on a surface of a three dimensional object comprising:

sensing means including light projecting means having an optical axis and first and second light sources disposed thereabout, and light collecting means having a photomultiplier disposed therein;

means for energizing said first light source during a first half of a selected period and said second light source during a second half of said selected period so as to provide light projected by said light projecting means from only one of said light sources during either of said first or said second half of said selected period;

means for automatically positioning said sensing means at a position along a profiling pattern so as to be substantially aligned with said point on said surface, said photomultiplier being energized by light reflected from said surface and collected by said light collecting means;

means for recording two-coordinate data for said point as a function of said position of said sensing means along said profiling pattern;

means for providing first and second signals as a function of the light impinging on said photomultiplier during said first and second halves of said selected period, respectively;

means for comparing said first and second signals to provide error signals indicative of the difference in the amount of light impinging on said photomultiplier during the two halves of said selected period;

means responsive to said error signals for automatically controlling the position of said sensing means to be substantially at a predetermined distance from said point; and means for recording third coordinate data for said point as a function of the position of said sensing means when substantially at said predetermined distance from said point.

9. An automatic system for deriving three-coordinate data of a point on a surface of a three-dimensional object comprising:

sensing means including light projecting means having an optical axis and a light source disposed therealong and light collecting means having an optical axis and a photosensitive member disposed with the center of a light sensitive surface thereof along the optical axis of said light collecting means;

means for automatically positioning said sensing means at a position along a profiling pattern so as to be substantially aligned with said point on said surface, said light collecting means collecting at least a portion of the light projected by said light projecting means so as to impinge on said light sensitive surface, the collected light being reflected thereto by said surface at said point;

means for recording two-coordinate data of said point as a function of the position of said sensing means along said profiling pattern;

means including means connected to said photosensitive member for providing an error signal as a function of the point of impingement of said collected light on said light sensitive surface;

means responsive to said error signal for automatically controlling the position of said sensing means to be substantially at a predetermined distance from said reflecting point on said surface;

means for recording third coordinate data for said point as a function of the position of said sensing means when substantially at said predetermined distance from said reflecting point.

10. In a system for detecting the position with respect to a reference plane of a point on a surface of a three-dimensional object, the improvement comprising:

a surface sensor including light projecting means and light collecting means;

means for positioning said surface sensor with respect to said reference plane so that light projected by said signal projecting means is reflected at said point and collected by said signal collecting means;

means for analyzing said collected light for producing an error signal which is a function of the difference between a predetermined distance and the actual distance between said surface sensor and said point on said surface, said positioning means being responsive to said error signal for adjusting the position of said surface sensor to be substantially at said predetermined distance from said point; and means for recording the position of said surface sensor with respect to said plane when said surface sensor is substantially at said predetermined distance from said point on said surface.

11. In a system for detecting the position with respect to a reference plane of a point on a surface of a three-dimensional object, the arrangement comprising:

sensor means including light projecting means for projecting light, light collecting means for collecting light reflected thereto, scanning means for modulating the light collected by said light collecting means and photosensitive means for providing a first signal as a function of the modulated light sensed thereby;
positioning means for positioning said sensor means with respect to said reference plane so that at least a portion of the light projected by said light projecting means is reflected at said point on said surface and collected by said light collecting means, said light being modulated by said scanning means, said photosensitive means being responsive to said modulated light to provide said first signal as a function thereof;
means for generating a reference signal;
means for comparing said first signal and said reference signal for providing error signals which are a function of the difference between a predetermined distance and the actual distance between said sensor means and said point on said surface, said positioning means being responsive to said error signals for adjusting the position of said sensor means to be at substantially said predetermined distance from said point; and
means for recording the position of said sensor means with respect to said plane when said sensor means is substantially at said predetermined distance from said point on said surface.

12. In a system for detecting the position with respect to a reference plane of a point on a surface of a three-dimensional object, the arrangement comprising:
sensor means including light projecting means for projecting light, light collecting means for collecting light reflected thereto, scanning means for modulating the light collected by said light collecting means and photosensitive means for providing first signals as a function of the modulated light sensed thereby;
positioning means for positioning said sensor means with respect to said reference plane so that at least a portion of the light projected by said light projecting means is reflected at said point on said surface and collected by said light collecting means, said light being modulated by said scanning means, said photosensitive means being responsive to said modulated light to provide said first signals as a function thereof;
means for generating reference signals;
means for correlating said first signals and said reference signal to detect time delays therebetween;
means for providing error signals as a function of said time delays between said first signals and said reference signals;
said positioning means being responsive to said error signals for adjusting the position of said sensor means to be substantially at a predetermined distance from said point; and
means for recording the position of said sensor means with respect to said plane when said sensor means is substantially at said predetermined distance from said point on said surface.

13. In a system for detecting the position with respect to a reference plane of a point on a surface of a three-dimensional object, the arrangement comprising:
sensor means including light projecting means for projecting light, light collecting means for collecting light reflected thereto, scanning means for modulating the light collected by said light collecting means and photosensitive means for providing first signals as a function of the modulated light sensed thereby;
positioning means for positioning said sensor means with respect to said reference plane so that at least a portion of the light projected by said light projecting means is reflected at said point on said surface and collected by said light collecting means, said light being modulated by said scanning means, said photosensitive means being responsive to said modulated light to provide said first signals as a function thereof;
means for generating reference signals;
means for correlating said first signal and said reference signal to detect time delays therebetween;
means for providing error signals as a function of said time delays between said first signals and said reference signals;
means responsive to said error signals for providing digital signals related thereto;
means including differential delay means responsive to said digital signals for differentially delaying said first signals and said reference signals so as to minimize detected time delays therebetween; and
means responsive to said digital signals for providing a count thereof, said count being a function of the difference between a predetermined distance and the actual distance between said sensor means and said point on said surface.

14. An automatic profiling system for deriving three coordinate data for a point on a surface of a three-dimensional object as recited in claim 1 wherein, said means for automatically controlling the distance between said sensing means and said point on said surface to be substantially equal to a predetermined distance includes:
means for projecting a light beam to a point on said surface along a first path;
means for receiving light reflected from said point on said surface, including:
means for detecting a departure of the angularity of the reflected light from a predetermined reference angularity and for generating an error signal representative thereof; and
means responsive to said error signal for altering the distance between said sensing means and the point on said surface until said reflected light takes said predetermined angularity.

References Cited
UNITED STATES PATENTS

| | | | |
|---|---|---|---|
| 2,674,151 | 4/1954 | Garrett et al. | 250—219 |
| 2,896,501 | 7/1959 | Stamps | 250—202 |
| 3,016,464 | 1/1962 | Bailey | 250—219 |

WALTER STOLWEIN, *Primary Examiner.*

RALPH G. NILSON, *Examiner.*

M. ABRAMSON, *Assistant Examiner.*